United States Patent [19]

Jones

[11] Patent Number: 5,354,080
[45] Date of Patent: Oct. 11, 1994

[54] INDUSTRIAL TRUCK FOR DOUBLE-FACED PALLETS

[76] Inventor: Robert E. Jones, 2519 Larkin Dr., Sun City Center, Fla. 33573

[21] Appl. No.: 65,198

[22] Filed: May 20, 1993

[51] Int. Cl.$^5$ ............................................. B62D 33/08
[52] U.S. Cl. ............................ 280/43.12; 280/43.17; 254/2 C
[58] Field of Search ..................... 280/43.12, 641, 38, 280/651, 43.17, DIG. 11; 414/495, 723, 705, 530, 533; 254/2 B, 2 C

[56] References Cited

U.S. PATENT DOCUMENTS

| | | | |
|---|---|---|---|
| 2,358,957 | 9/1944 | Barrett | 280/43.12 |
| 2,359,493 | 10/1944 | Schreck | 254/2 |
| 2,417,394 | 3/1947 | Framhein | 280/43.12 |
| 2,550,548 | 4/1951 | Framhein | 280/43.12 |
| 2,598,151 | 5/1952 | Warshaw | 280/43.12 |
| 2,993,703 | 7/1961 | Paradise | 280/43.12 |
| 3,876,221 | 4/1975 | Bryntse | 280/43.12 |
| 4,615,533 | 10/1986 | Sewell | 280/43.12 |

FOREIGN PATENT DOCUMENTS 2912374 10/1980 Fed. Rep. of Germany ... 280/43.12

OTHER PUBLICATIONS

The Raymond Corp., "The Advanced Raymond Walkies: Stepping up the Pace Again", 1989.
The Raymond Corp., "The New Raymond Walkies", 1992.
Crown, "Rider Pallet Trucks", 1993.
Clark Material Handling Co., "P/HWP Series", 1990.
Hyster Co., "Productivity by Design", 1991.
Yale Materials Handling Corp., "Yale-Models MPW, MPE, MPC", 1990.
Prime Mover Co., "Prime Mover-The Best of Both Worlds", 1990.

Primary Examiner—Richard M. Camby
Assistant Examiner—Carla Mattix

[57] ABSTRACT

A low lift pallet truck so configured, in its lowered and unladen mode, that entry into and exit from double-faced pallets is made without contact of its fork wheels and the pallet's bottom boards. In this mode, support wheel assemblies fixedly mounted on each side of the truck fork frame, position the forks above their normal lowered height. Lift linkage rod assembly springs retract the fork wheels upward into the fork structure clear of the floor. Therefore with the truck's drive wheel and support wheels bearing its weight, the truck can be moved with its forks positioned above the pallet bottom boards free of interference. When the forks are properly positioned in the pallet, operator actuation of the lift function causes the truck fork frame to rise and move the lift linkage to drop the fork wheels to floor contact. Simultaneously the support wheels move upward with the fork frame and no longer carry the truck's fork end weight loadings. Lifting is stopped when the pallet is clear of the floor. The truck suspension is now in the mode common of most low lift pallet trucks. Deposit of the pallet by actuation of the truck lowering control, returns the truck to its original lowered and unladen counter-balanced configuration and exit from the pallet is made without contact with the pallet bottom boards. Driver control actions required in operation of the trucks of the embodiments of this invention are identical to those of most prior construction trucks.

9 Claims, 5 Drawing Sheets

INDUSTRIAL TRUCK FOR DOUBLE-FACED PALLETS

BACKGROUND

1. Field of Invention

This invention relates to low lift pallet trucks, specifically to those used to transport loads on double-faced pallets.

2. Description of Prior Art

Prior construction low lift pallet trucks are commonly used in retail stores, warehouses and factories for moving palletized loads. In order to move loads on double-faced pallets, it is necessary that the truck's forks enter the pallet. FIG. 1 shows a typical prior construction truck and FIG. 5 shows a typical double-faced pallet.

During fork entry these trucks must climb onto and roll along the pallet bottom boards. Once fully positioned, the fork lift frame is elevated as the forks wheels pass to a position over the void in the pallet bottom boards. The pallet is then elevated clear of the floor and truck travel initiated.

At arrival at its destination, the fork frame is lowered and the pallet deposited. Exit of the forks again requires the climb and roll along the pallet bottom boards.

Prior construction trucks have proven inconsistant in these entry and exit operations. Various devices such as skids, rollers, and discs are mounted to the fork underside fore and aft of the fork wheels. However variations in pallet flatness, bottom board thickness, and bottom board warpage as well as floor slickness often cause pallet movement with the truck. Additionally, misalignment of the truck's fork tips at entry, excessive fork wheel loadings, contamination of the afore-mentioned entry/exit devices and fork wheel wear contribute to their unreliability. Entry into and exit from unloaded and lightly loaded pallets is particularly bothersome.

The more commonly known sit-down counter-balance type lift trucks for instance do not have such pallet entry and exit problems. Their forks extend out entirely beyond their fork end load bearing wheels. Low lift pallet trucks, despite the serious operational problems described have several advantages over other fork trucks. Much lower initial cost and weight, simplicity of operation, and lower required operating space all account for their popularity. To improve the reliability of low lift pallet trucks it is important to improve their entry and exit performance by reducing horizontal reactive forces on pallets used with these trucks.

U.S. Pat. No. 4,615,533 to Sewell (1986) describes the addition of a complicated hydraulic system to tilt back a fully lowered truck before entry by means of one or two hydraulic cylinders, and small rollers. This system requires additional driver operations, judgement, and time. The addition of one or two hydraulic cylinders, extension springs, slide assemblies, a hydraulic electric valve, electric switches and wiring, and their mountings and cover, all mounted outside of the truck body, make this method and apparatus unduly expensive and burdensome in operation.

Since all descriptions and claims in the Sewell patent are for a pressurized hydraulic system, I would add the likely increased occurrence of oil leakage at the many added oil connections to be another disadvantage of his system.

In the patent searches I made for low lift pallet trucks patents granted from 1941 thru April of 1993, I found only one patent of the lower linkage using rotating lower links. This is U.S. Pat. No. 2,359,493 to Schreck (1944) which recites the lower link, rod assembly (but of one rigid length), and fork wheel lever and without elevation of the fork wheels clear of the floor.

OBJECTS AND ADVANTAGES

Accordingly, besides the advantages of low lift trucks herefore described, several objects and advantages of the invention are:

(a) to provide a reliable fork entry and exit system for low lift pallet trucks in use with double-faced pallets.

(b) to provide a means of eliminating contact between the truck's fork wheels and pallet bottom boards during such wheels pallet entry and exit operations.

(c) to provide a means of decreasing pallet damage and wear now attributable to prior construction low lift truck's entry and exit performance (d) to provide larger entry-exit rollers for instances where low lift pallet trucks encounter pallets having thicker than normal bottom boards or those that are warped or damaged.

(e) to provide a pallet entry-exit system that does not require the low lift pallet truck driver any change in the "lift" and "lower" actuations required on prior construction trucks, (f) to provide a simple means for the conversion of prior construction trucks to the embodiments and advantages of this invention.

(g) to provide a fork frame of increased underclearance and protection of its vulnerable lower linkages.

(h) to provide a shortened truck wheelbase which, in aligning the forks for pallet entry, results in a higher rate of lateral movement of the fork ends than does steering a longer wheelbase configured truck.

(i) to provide that the benefits of this patent are applicable to all low lift pallet trucks including those of driver end and center control including those of walk-only, walk or ride, and ride only driver positioning.

Still further objects and advantages will become apparent from the specifications and drawings.

DRAWING FIGURES

In the drawings, closely related figures have the same number but different alphabetic suffixes.

REFERENCE NUMERALS IN DRAWINGS

| 10 | fixed frame | 48 | battery support plate |
|---|---|---|---|
| 12 | lift frame | 50 | typical double-faced pallet |
| 12a | lift frame | 52 | pallet stringer |
| 14 | drive wheel | 54 | pallet bottom board |
| 16 | steer handle | 56 | pallet top board |
| 18 | speed control handgrip | 58 | support wheel assembly |
| 20 | lift switch button | 60 | pull rod assembly |
| 22 | (not used) | 62 | support wheel frame |
| 24 | lowering switch button | 64 | mounting screw |
| 26 | lift cylinder | 66 | lockwasher |
| 28 | upper link | 66a | lockwasher |
| 30 | lower link | 68 | shim pack |
| 30a | lower link | 70 | support wheel |
| 32 | pivot pin | 72 | anti-friction bearing |
| 32a | pivot pin | 74 | support wheel axle assembly |
| 32b | pivot pin | 76 | screw |
| 32c | pivot pin | 78 | pull rod |
| 32d | pivot pin | 78a | push rod |
| 32e | pivot pin | 80 | jam nut |
| 32f | pivot pin | 82 | push rod assembly |
| 34 | (not used) | 84 | link clevis |
| 36 | fork wheel lever | 86 | lever clevis |
| 36a | fork wheel lever | 88 | stop collar |
| 38 | hex collar | 90 | shear pin |
| 40 | lift fork | 92 | retraction spring |
| 42 | fork wheel assembly | | |
| 44 | fork wheel axle | | |
| 46 | battery | | |

DESCRIPTION

FIGS. 1 THRU 7A

Figure 1:
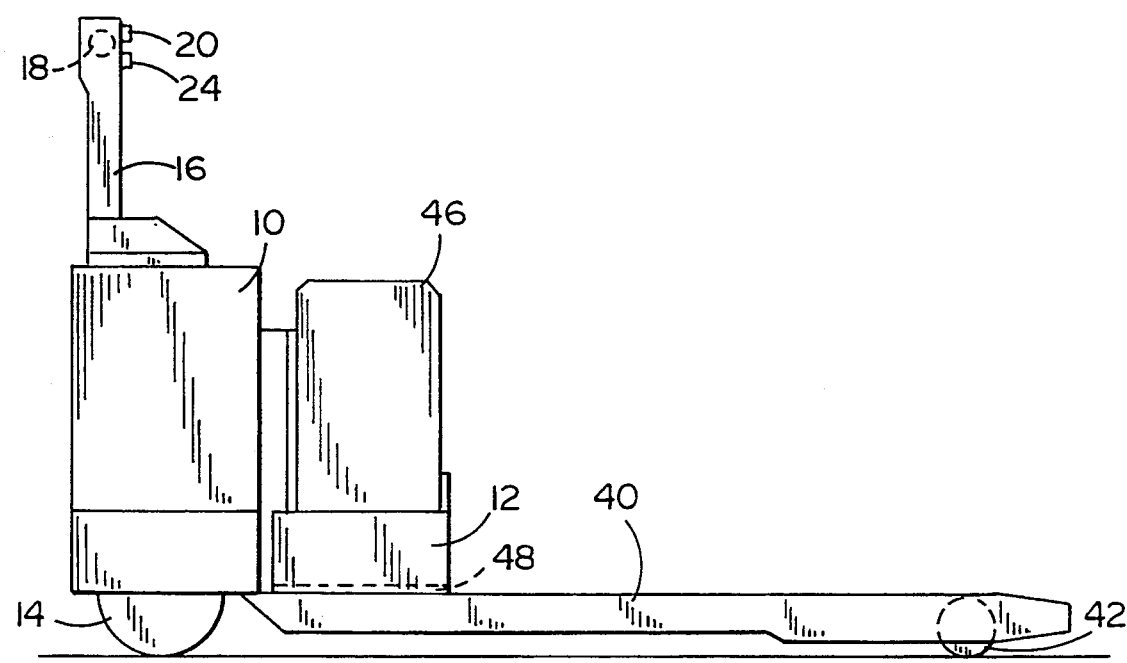
FIG. 1 shows a side elevation view of an exemplar prior construction low lift truck.
Figure 2:
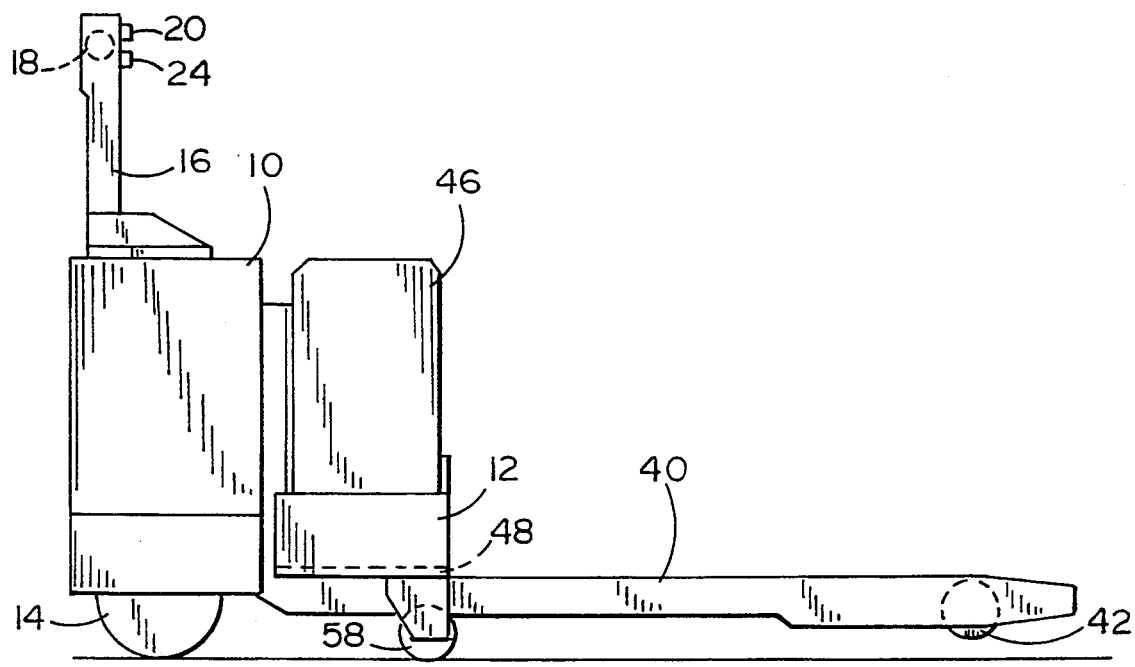
FIG. 2 shows a side elevation view of an exemplar embodiment of the low lift pallet truck described in this invention.

FIG. 1 shows a typical prior construction low lift pallet truck and exteriorly visible components that are also shown in FIG. 2 which illustrates such componentry used in this invention, A fixed frame 10 is typically a steel weldment providing enclosure and structure for traction and electrical power and control functions. Additionally all mountings from lift frame 12 are included on the structure of the frame 10.

In FIGS. 1 and 2 a drive wheel 14 mounts at the output shaft of a drive unit (not shown) which consists of a transmission, an electric motor and brake. The drive unit is mounted to the frame 10 by a horizontal bearing which allows rotation of the drive unit in response to its positioning by a steer handle 16.

In the walk-only type trucks shown as exemplar in FIGS. 1, 2, 3, and 3A, the steer handle 16 is also mounted to pivot vertically down and outward from the frame 10 in an approximately 90 degree arc. Handle 16 is spring positioned to a substantially vertical position where the drive unit brake becomes applied and the drive unit motor electrically disconnected. Movement of the handle 16 downward then allows truck movement until essentially a horizontal position again brings in its full-up position restraints. Near the upper end of the handle 16, driver controls are positioned for operation during travel. A control handgrip 18 extends each side the handle 16 for use as directional and speed regulation of the truck. A lift switch button 20, and a lowering switch button 24 are mounted near by.

The lift frame 12 is a rigid welded steel frame providing horizontal retainment for a battery 46 on four sides and a battery support plate 48 below. Vertical bars on the front battery enclosure plate provide structure for a lift cylinder 26, one or two upper links 28, and lower links 30 best shown in FIGS. 3, 3A and 4. Also integral with frame 12 are two Fork 40 lengths placed low on the frame each spaced equally from its longitudinal centerline. The forks 40 are typically inverted "C" sections which provide open bottom space for horizontal linkage members and retraction space for a fork wheel 42 near the end of each and flat wide surfaces on top for pallet contact.

Figure 4:
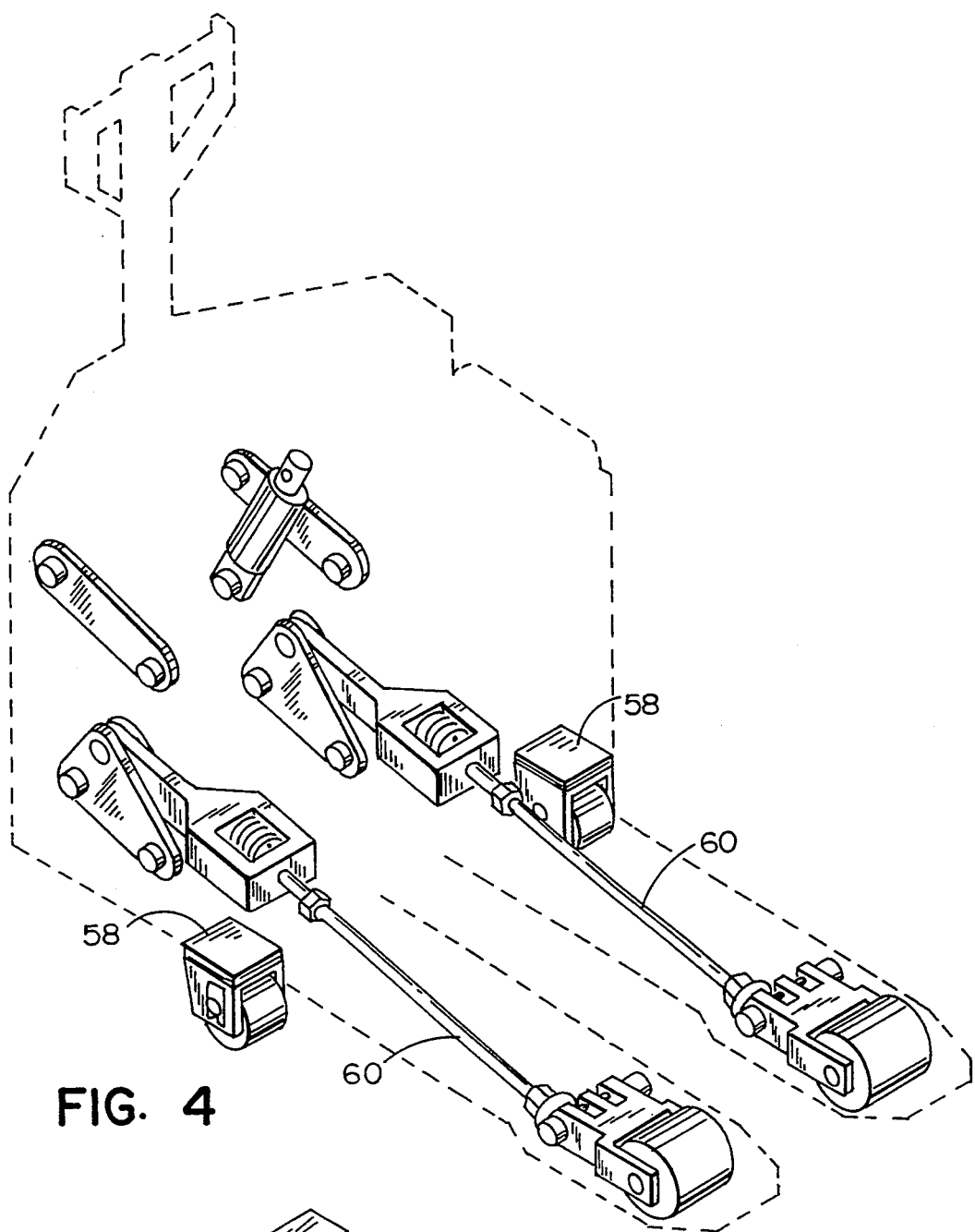
FIG. 4 shows a phantom perspective view of the first embodiment of unique assemblies installation as described in this invention.
Figure 6:
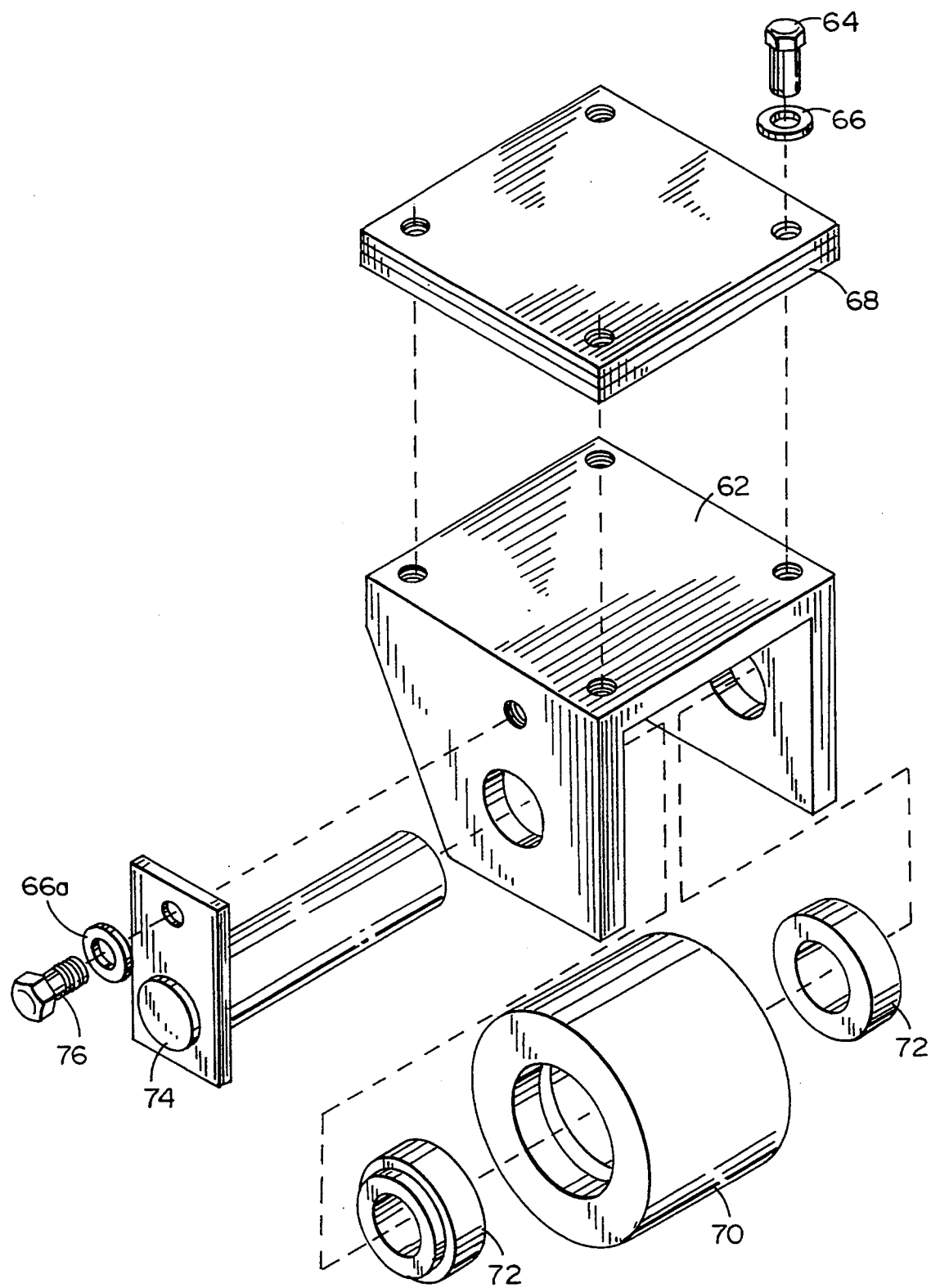
FIG. 6 shows an exploded view of an exemplar support wheel assembly as described in this invention.

Also shown in FIG. 2 is a simplistic support wheel assembly 58 which is mounted to the bottom of the battery plate 48 (or its extension, in cases where a wider than standard fork spread is used) on each side of frame 12 equally spaced from the trucks longitudinal centerline. FIG. 4 illustrates this positioning and FIG. 6 shows the construction and mounting of a support wheel assembly 58. In FIG. 6 is shown a support wheel frame 62 providing an inverted "U" structure with four threaded holes in its top surface and a thru bore in each leg with tapped holes nearby. A support wheel 70 is assembled with anti-friction bearings 72 in each of its bored ends for positioning between the legs of the wheel frame 62 and aligned for insertion of a support wheel axle assembly 74. The axle assembly 74 is then retained in the wheel frame 62 by the assembly of a lockwasher 66a and a screw 76 thru the flag plate on axle assembly 74 and into a tapped hole of the frame 62.

Installation of the support wheel 58 is made by positioning its mounted height (variable mainly because of manufacturing tolerances in the frame 12 weldment) by use of a shim pack 68, which is a stack of thin steel shim plates, to obtain the desired fork to floor distance. A screw 64 is, installed with lockwasher 66 near each corner of the top surface of the wheel frame 62 to complete installation.

Figure 3:
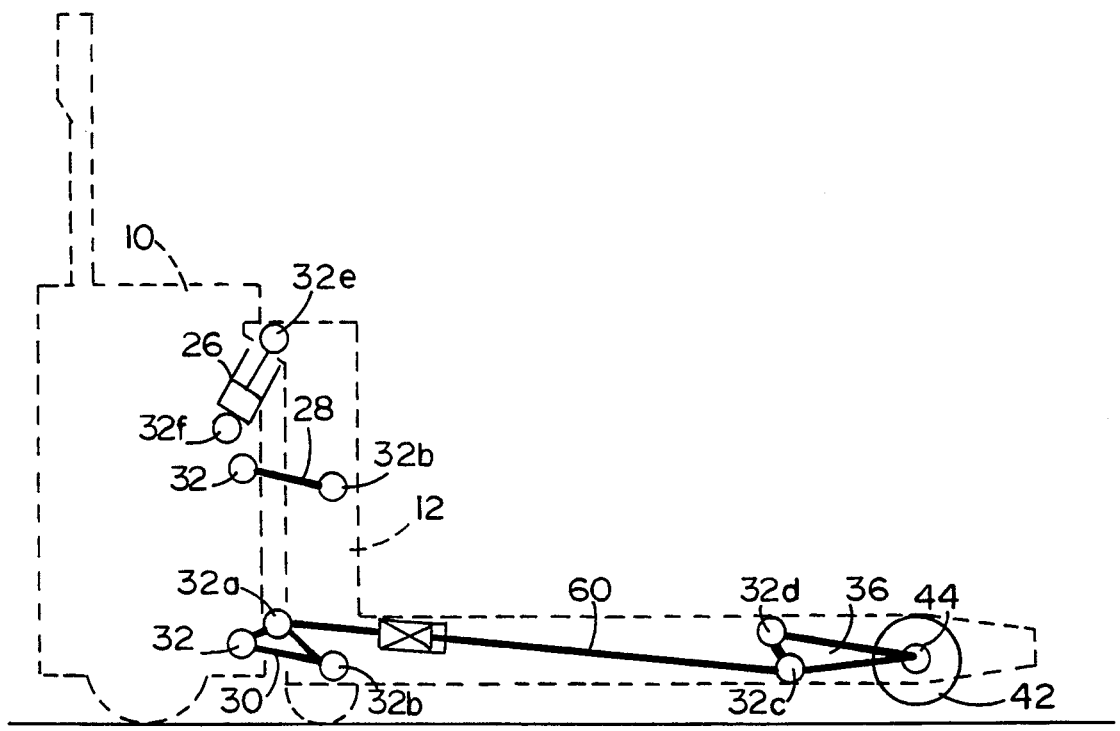
FIG. 3 shows a schematic side view of an exemplar lift linkage for the first embodiment described in this invention.
Figure 7:
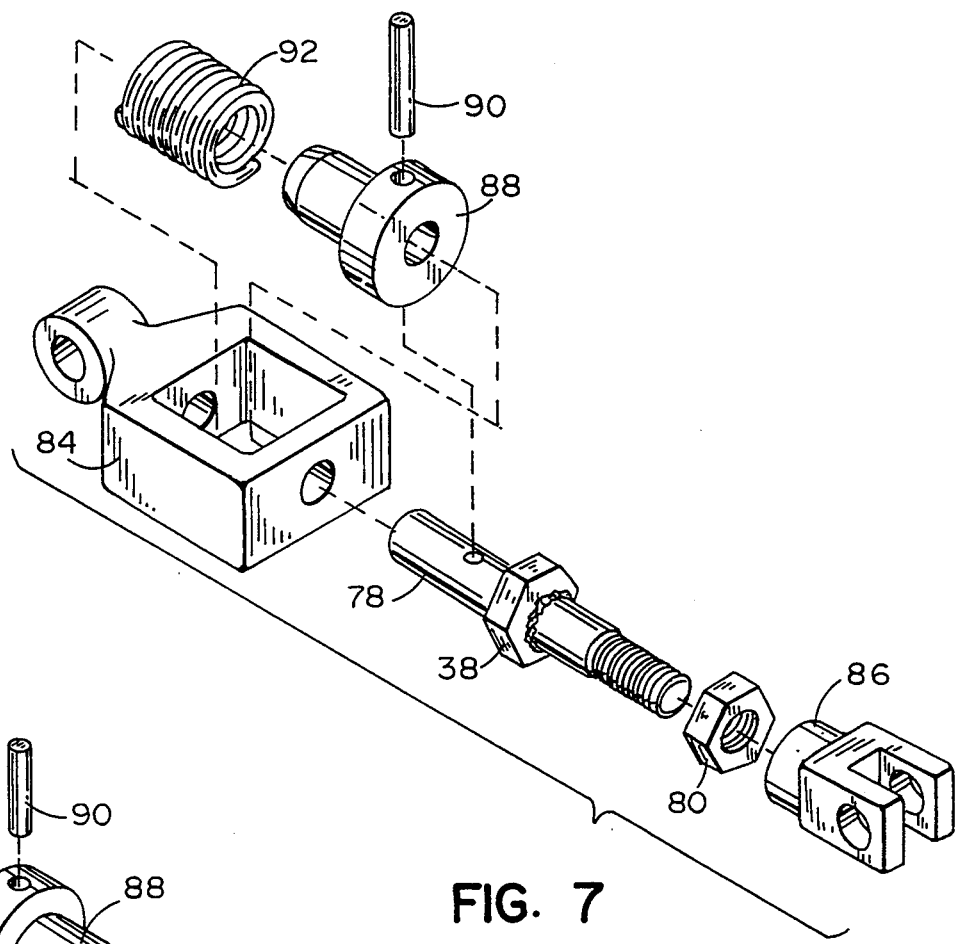
FIG. 7 show an exploded view of an exemplar first embodiment pull rod assembly as described in this invention.

FIGS. 3, 4 and 7 best illustrate a lift linkage for the first embodiment of this invention. FIG. 3 shows schematically the installation of its members and their connections. FIG. 4 and 7 provide the detail and placement of shapes and connections.

FIG. 3 also shows the fork wheel 42, a urethane tired core with antifriction bearings in each of its ends. Mounting of fork wheel 42, is by a fork wheel axle 44 to a fork wheel lever 36 and a pivotal attachment of the lever 36 to fork 40 of the lift frame 12 of each fork by a pivot pin 32d. A third pivot point on the lever 36 is made to a pull rod assembly 60 at a lever clevis 86 by a pivot pin 32c. The pull rod assembly 60 also consists of a pull rod 78 which is threaded to the lever clevis 86 and a jam nut 80 and has in its length a hex collar 38 held fixedly in place. At its other end rod 78 is slideably mounted into a bore thru the first end and into the body of a link clevis 84. The pull rod 78 is held in a slideable connection to the link clevis 86 by installation of retracting spring 92 and the retainment of stop collar 88 by a shear pin 90 at a transverse hole in the pull rod 78.

The link clevis 84 is shown in its simplist form in FIG. 7 and may be more practically built in assembled parts. Connection of pull rod assembly 78 at its front end is thru a pivot pin 32a to a lower link 30 thru its top pivotal connection. The lower link 30 is pivotably connected to the frame 10 by a pivot pin 32 and to the lift frame 12 by the pin 32b.

The lift cylinder 26 is typically a single acting hydraulic linear actuator mounted at the longitudinal centerline with transverse pivotable connections at the ends of its substantially vertical position as shown in FIGS. 3 and 4. The cylinder 26 connects to fixed frame 12 at its upper pivotal connection with pivot pin 32e and at its lower pivotable end by a pivot pin 32f.

Figure 3A:
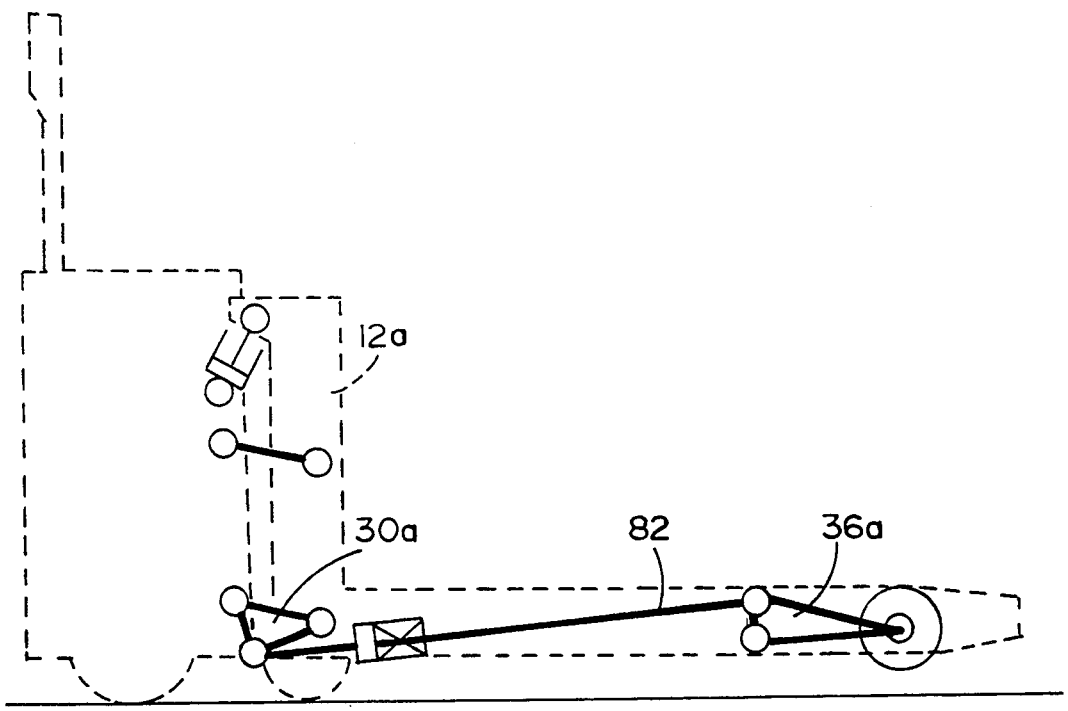
FIG. 3A shows a schematic side view of an exemplar lift linkage for an alternate embodiment as described in this invention.
Figure 7A:
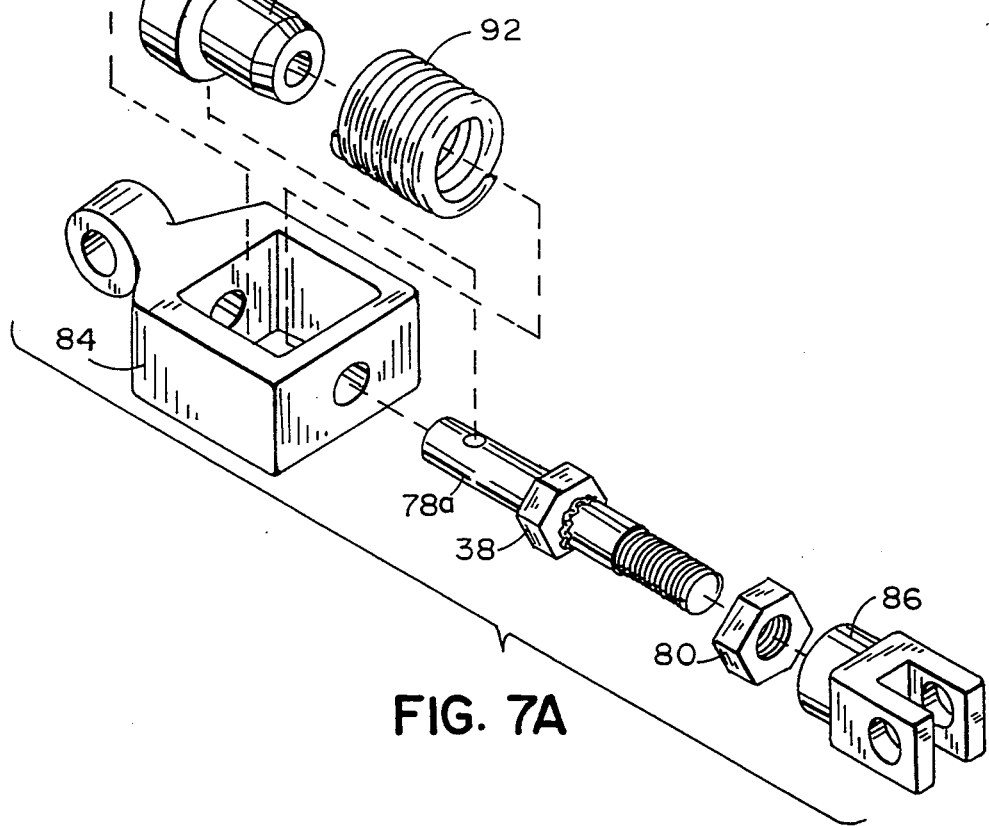
FIG. 7A shows an exploded view of an exemplar push rod assembly as used in the alternate embodiment described in this invention.

An alternate embodiment of this truck using a lift linkage that is of a push-to-lift configuration is also included in this invention. Best understood in FIGS. 3A and 7A this alternative is simply a reversal of lower linkage action from the pull-to-lift (and push-to-lower) action of the first embodiment. In FIG. 3A a frame 12a relocates the pivotal connection to a lift lever 36a to a lower position on the fork end of the frame 12a and lift lever 36a becomes a mirrored image of the lift lever 36 of the first embodiment. Likewise a lower link 30a is a mirror image of the link 30 of that embodiment. In FIG. 7A the push rod assembly 82 is made from most components used in the pull rod assembly 60 except a push rod 78a replaces pull rod 78 because of a required relocation of its radial hole. This relocation allows reversal of retraction spring 92 and stop collar 88 positions in the push rod assembly 82.

Figure 5:
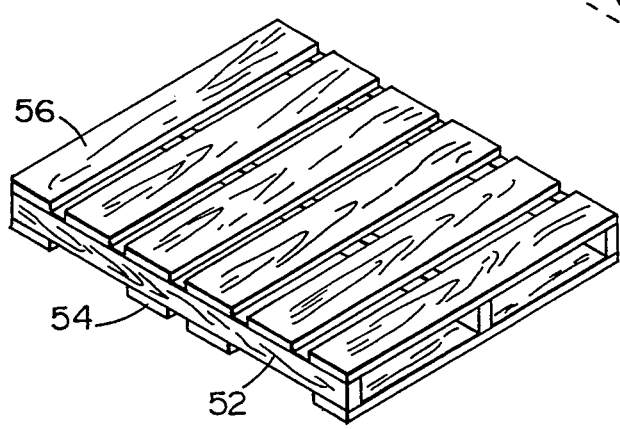
FIG. 5 shows a perspective view of a typical double-faced pallet.

FIG. 5 illustrates a typical double-faced pallet 50 of wood construction in varying over-all width and length. Generally their assembly is with glue and nails.

In FIG. 5 three pallet stringers 52 space a varying number of pallet bottom boards 54 and top pallet boards 56 to create a fork opening. Voids near each in the spacing of said bottom boards 54 near each end of the pallet allow the movement of low lift pallet truck fork wheels to the truck's pallet supporting surface.

OPERATION

FIGS. 2 thru 7A

The basic geometry of the lift and lowering linkages used in both the first and alternate embodiments of this invention are similar to those of prior construction trucks. However in order to obtain further movement of their fork wheels after lowering of their fork frames have been stopped, special, pull-to-lift and push-to-lift rod assemblies are used.

In both FIGS. 2, 3, and 3A the trucks are shown positioned with the lift linkage lowered. The support wheel assemblies 58 and drive wheel 14 are in floor contact and fork wheels 42 are retracted into forks 40 of lift frame 12 (or 12a in the case of alternate embodiment). In this position the truck is counterbalanced with enough weight carried on drive wheel 14 to allow traction and truck. This position is used for pallet entry and exit.

FIG. 3 best shows the linkage for positioning a lift frame 12 vertically in the first embodiment of this invention. Driver actuation of a steer handle mounted speed control handgrip 18 moves the truck rearward fully into a pallet shown as a typical double-faced pallet 50 in FIG. 5. After stopping the truck, actuation of a lift switch button 20 causes pressurized hydraulic oil to flow from a hydraulic pump unit in a fixed frame 10 to a hydraulic cylinder 26 mounted between the frames 10 and 12 in a substantially vertical position. Extension of cylinder 26 causes movement of the frame 10 in a path determined by a pair of upper links 28 and a pair of lower links 30 which are also mounted each adjacent a fork between the frame 10 and the frame 12. Each lower link 30 is pivotally connected to fixed frame 10 by pivot pin 32, to lift frame 12 by pivot pin 32b, and by pivot pin 32a to each of a pair of pull rod assemblies 60, each pivotally connected to one of a pair of fork wheel levers 36 by pivot pin 32c. Fork wheel levers 36 are each pivotally connected to lift frame 12 by pivot pin 32d.

Movement of the lower links 30 then causes the drop of fork wheels 42 also mounted on levers 36. At floor contact fork wheels 42 assume the fork end truck weight loading since the pair of support wheel assemblies 58 have been raised with the frame 12. This increased loading of fork wheels 42 collapses the retraction springs 92 and causes lift loadings to be carried on the smaller diameter face of stop collar 88 both as seen in FIG. 7 and 7A. Once the pallet is clear of the floor, lift actuation is discontinued and the truck is in its travel mode.

In lowering and depositing the pallet lowering switch button 24 is operated to fully lower the lift frame 12 (or 12a) to effectively reverse the lifting actions of the truck previously described.

For operation of the alternate embodiment, FIGS. 3A and 7A show the revision of the truck lift linkage that basically changes the pivot end positions of the rod assemblies to reverse its direction to a push-to-lift action. To also reverse its retraction direction to a pull action, a push rod assembly 82 is shown to reverse the assembly positions of the retracting spring 92 and stop collar 88. Driver operating actions for trucks of the first and alternate embodiments are identical.

SUMMARY, RAMIFICATIONS, AND SCOPE

Accordingly, the reader will see that the truck of this invention can be used in the loading and unloading of double-faced pallets to and from its forks in a reliable manner. Furthermore its unique fork wheel and support wheel suspension used in its lowered and unloaded suspension has the following advantages:

- Since contact of the truck fork wheels and the pallet bottom boards is eliminated (or greatly decreased in abnormal pallet conditions), wear of and damage to pallets is reduced.
- Since double-faced pallets of thicker or warped bottom boards may be encountered, the large diameter fork wheels provide a more effective entry and exit aid than do prior construction trucks using various rollers, skids, and discs.
- Driver control actions necessary for truck operation of the embodiments of this invention are identical to those for prior construction trucks making driver training unnecessary.
- The conversion of prior construction trucks to the embodiments of this invention requires only the addition of two support wheel assemblies and substitution of two rod assemblies.
- The position of the support wheel assemblies in the embodiments of this invention offer a degree of protection to the lower part of the truck's lift linkages, particularly during operation of such trucks on ramps and dockboards.
- Since prior construction trucks require collision with and travel along pallet bottom boards during pallet entry and exit while trucks of the embodiments of this invention do not, fork wheel wear and damage is reduced.

I claim:
1. A low lift pallet truck comprising: a fixed frame; a lift frame having a lift fork and fork wheels; two support wheel assemblies one on each side of and beneath a battery compartment of said lift frame; a battery; a lift linkage including a linear actuator, an upper link, two lower links, and two rod assemblies each having a forward end and a rearward end, and further having means at the forward end of each said rod assembly for fully retracting said fork wheels, said means comprising a rod having a forward end and a rearward threaded end, a link clevis pivotally connected to one of said lower links and having a sliding connection along the longitudinal axis of the rod, a stop collar attached near the forward end of the rod and contacting a retraction spring assembled concentrically over said stop collar whereby said stop collar and retraction spring are both contained within said link clevis, and a hex collar fixed concentrically to said rod between said link clevis and the rearward end of said rod at a point where the threaded end of said rod connects with a mating threaded hole in a lever clevis, said lever clevis pivotally mounting a fork wheel lever to said lift fork, said fork wheel being rotatably mounted on said fork wheel lever; whereby said means for fully retracting provides a gap between said fork wheels and the truck supporting surface when said lift frame is fully lowered thereby carrying the truck rear vertical loadings on said support wheel assemblies.

2. The low lift pallet truck as set forth in claim 1 wherein said rod assembly means for fully retracting transmits all forces of said retraction spring through said stop collar and said link clevis.

3. The low lift pallet truck as set forth in claim 1 wherein said retraction spring changes the length of said rod assembly by only a distance necessary to retract said fork wheel after said lift frame is fully lowered.

4. The low lift pallet truck as set forth in claim 1 wherein said rod assembly means for fully retracting further comprises means for adjusting each said rod assembly length without disassembly of said rod assembly after said lift linkage is installed said truck.

5. The low lift pallet truck as set forth in claim 1 wherein each said rod assembly further comprises means for retaining both ends of said retraction spring wholly within said rod assembly.

6. The low lift pallet truck as set forth in claim 1 wherein each said rod assembly further comprises means to position said fork wheels in contact with the truck supporting surface only when said lift frame is elevated.

7. The low lift pallet truck as set forth in claim 1 wherein each said rod assembly further comprises means for converting a truck having fixed length rods and fork wheels which do not fully retract, whereby said fixed length rods are replaced by said rod assemblies to allow full retraction of said fork wheels without altering the structure of said lift fork.

8. The low lift pallet truck as set forth in claim 1 wherein each said rod assembly further comprises means to extend said retraction spring to change the length of said rod assembly when the fork wheels are unladen.

9. The low lift pallet truck as set forth in claim 1 wherein each said rod assembly further comprises means including interchangeable parts which permit pull-to-lift use and push-to-lift use.

* * * * *